Patented Feb. 11, 1947

2,415,787

UNITED STATES PATENT OFFICE 2,415,787

UNSYMMETRICALLY SUBSTITUTED PIPERAZINES

Johannes S. Buck, East Greenbush, and Richard Baltzly, New York, N. Y., assignors to Burroughs Wellcome & Co. (U. S. A.) Inc., New York, N. Y., a corporation of New York No Drawing. Application January 6, 1944, Serial No. 517,225

5 Claims. (Cl. 260—268)

This invention relates to N-monosubstituted and N,N'-unsymmetrically disubstituted piperazines and has for an object to provide new compositions of the above type and a novel and improved method of making the same.

Another object is to provide a method of making and isolating the above substances which is suitable for commercial operation.

The main difficulty involved in preparing monosubstituted piperazines, from which unsymmetrically disubstituted derivatives can also be obtained, resides in the isolation of the substance from the unreacted piperazine and the disubstituted piperazine which are present and which in many cases have similar boiling points. Amines are extremely hard to separate by fractional distillation unless their boiling points are widely separated. Furthermore, the classical methods of separating secondary from tertiary amines are of no avail in this case, since a monosubstituted piperazine reacts as both a secondary and a tertiary amine.

In our copending application Serial No. 476,914 of which the present application is a continuation in part, we disclosed a method for making mono-aralkyl substituted piperazines and unsymmetrically disubstituted piperazines in which at least one of the substituents is an aralkyl.

In accordance with the present invention, we have found that certain mono-alkyl substituted piperazines and the corresponding unsymmetrically disubstituted compounds can be made by treating the piperazine with an alkyl halide containing from 8 to 18 carbon atoms in the molecule. The ensuing reaction produces mixtures which contain, in addition to unreacted piperazine and symmetrically di-alkyl substituted piperazine, considerable quantities of the corresponding mono-alkyl substituted piperazine. The monosubstituted compounds in which the substituent is an alkyl having from 8 to 18 carbon atoms have a relatively high stability and physical properties which make it possible to separate the monosubstituted compounds from the unreacted piperazine and from the disubstituted compounds by conventional methods, such as fractional distillation or selective solution.

After separation, if an unsymmetrically disubstituted piperazine is desired, the second substituent is introduced on to the second nitrogen atom by reacting the monosubstituted compound with a reagent such as for instance an alkyl halide containing an alkyl different from that present in the monosubstituted compound, a phenacyl halide, a substituted phenacyl halide, nitro urea, an isocyanate, a salt of thiocyanic acid, an alkyl or acyl iso-thiocyanate, a salt of S-alkyl isothiourea or an acylating agent.

Thus, unsymmetrical N—R—N'—R' piperazines can be obtained where R is an alkyl having 8 to 18 carbon atoms and R' is a radical different from R, and selected from the group consisting of alkyl, phenacyl, substituted phenacyl, hydroxy-phenalkyl (produced by reduction of the corresponding phenacyl compound), carbamido, substituted carbamido, thiocarbamido, substituted thiocarbamido, carbamido and acyl.

The process according to the invention makes it possible to obtain N—R—N'—R' disubstituted piperazines in which R is an alkyl having 8 to 18 carbon atoms and R' is a highly sensitive acyl, such as for instance nitro-benzoyl.

The following examples may serve to illustrate without limiting the invention.

Example 1

Thirty parts by weight of lauryl bromide and 14 parts by weight of piperazine were dissolved in 170 parts of 90% alcohol and warmed on the steam bath for 20 hours. The alcohol was evaporated and the residual salts basified with sodium hydroxide. The mixture was extracted with ether and the extract dried over $K_2CO_3$. On distillation at 0.25 mm. pressure there was obtained 13 parts of N-lauryl piperazine boiling at about 140° C.

Example 2

One mol octyl chloride was dissolved with 1.7 mols piperazine in dilute alcohol and heated in a pressure bomb at 140° C. for 5 hours. After opening the bomb, evaporation of the alcohol and basification of the residue, fractional distillation yielded monosubstituted N-octyl piperazine.

Example 3

N-decyl piperazine was prepared by reacting 1 mol of decyl iodide with 1.5 mols piperazine in dilute alcohol solution and separation of the mono substituted compound from the unreacted piperazine and from the disubstituted decyl piperazine by fractional distillation.

Example 4

N-tetradecyl piperazine was obtained by reacting 1 mol of tetradecyl bromide with 1.4 mols of piperazine and treating the reaction product according to Example 1 to obtain the monosubstituted compound.

Example 5

N-hexadecyl piperazine was prepared from equimolecular quantities of hexadecyl bromide and piperazine in the process according to Example 1.

Example 6

N-octadecyl piperazine was obtained from the reaction of 1 mol octadecyl iodide with 0.8 mol piperazine and a subsequent treatment of the reaction mixture according to Example 1.

Example 7

N-lauryl piperazine as obtained from the process according to Example 1, was treated in alcohol solution with equimolecular quantities of methyl iodide and sodium hydroxide to form N-lauryl-N'-methyl piperazine.

Example 8

One mol of N-decyl piperazine, as obtained from the process according to Example 3, was treated in solution with 3 mols of methyl iodide and 1 mol of sodium hydroxide. The reaction product was N-decyl-N'-methyl piperazine dimethiodide.

Example 9

N-octyl piperazine, as obtained from the process according to Example 2, was treated with a slight excess of phenacyl bromide to yield N-octyl-N'-phenacyl piperazine.

Example 10

N-hexadecyl piperazine, as obtained from the process according to Example 5, was treated with chloroacetocatechol forming N-hexadecyl-N'-(3,4-dihydroxyphenacyl) piperazine which was isolated as its dihydrochloride.

Example 11

The product obtained according to Example 10, was catalytically hydrogenated at room temperature with a platinum catalyst to yield N-hexadecyl-N'-(beta-3,4-dihydroxy-phenyl-beta-hydroxy ethyl) piperazine.

Example 12

N-octadecyl piperazine as obtained from the process according to Example 6, was dissolved in 95% alcohol and a slight excess of nitro urea was added. The solution was warmed cautiously until evolution of gas had ceased. The solution was then acidified with HCl, evaporated and the product, N-octadecyl-N'-carbamido piperazine hydrochloride purified by recrystallization from alcohol-ether mixture.

Example 13

N-decyl piperazine as obtained from Example 3, was reacted in benzene solution with phenyl isocyanate. The reaction product after recrystallization was N-decyl-N'-phenyl-carbamido piperazine.

Example 14

The process of Example 13 was repeated, using ethyl isocyanate as reagent instead of phenyl isocyanate. The reaction product was N-decyl-N'-ethylcarbamido piperazine.

Example 15

N-lauryl piperazine as obtained from Example 1, was reacted in alcoholic solution with a slight excess of potassium thiocyanate plus 1 equivalent of hydrochloric acid and extracted and purified to yield N-lauryl-N'-thiocarbamido piperazine.

Example 16

The process of Example 15 was repeated, using alpha-naphthyl isothiocyanate as reagent instead of potassium thiocyanate. The reaction product in this case was N-lauryl-N'-alpha-naphthyl-thiocarbamido piperazine.

Example 17

N-octyl piperazine as obtained from the process according to Example 2, was warmed in dilute alcohol solution with S-methyl isothiourea hydroiodide. Methyl mercaptan was evolved and from the solution, on evaporation and addition of acetone, N-octyl-N'-carbamidino piperazine hydroiodide crystallized. This was purified by crystallization from alcoholic solution.

N-lauryl piperazine as obtained from the process according to Example 1, when treated in the same manner, yields N-lauryl-N'-carbamidino piperazine hydroiodide.

Example 18

N-tetradecyl piperazine as obtained from the process according to Example 4 was reacted in benzene with p-nitrobenzoyl chloride. The resulting compound, N-tetradecyl-N'-p-nitrobenzoyl piperazine hydrochloride separated and was recrystallized from alcohol.

We claim:

1. In a method of preparing N-substituted piperazines the steps of treating piperazine with an alkyl halide containing from 8 to 18 carbon atoms in the molecule to form the reaction mixture containing, in addition to unreacted piperazine and di-alkyl substituted piperazine, a substantial amount of mono-N-alkyl substituted piperazine and separating the mono-N-substituted piperazine from the unreacted piperazine and from the disubstituted piperazine.

2. In a method of preparing N-substituted piperazine the steps of treating 0.8 to 1.7 mols of piperazine with 1 mol of an alkyl halide containing from 8 to 18 carbon atoms in the molecule to form a reaction mixture containing, in addition to unreacted piperazine and di-N-substituted piperazine, a substantial amount of mono-N-alkyl substituted piperazine and separating the mono-N-substituted piperazine from the unreacted piperazine and from the disubstituted piperazine.

3. In a method of preparing N-substituted piperazines the steps of treating piperazine with an alkyl halide containing from 8 to 18 carbon atoms in the molecule to form a reaction mixture containing, in addition to unreacted piperazine and di-N-substituted piperazine a substantial amount of mono-N-alkyl substituted piperazine, and separating the mono-N-substituted piperazine from the unreacted piperazine and from the disubstituted piperazine by fractional distillation.

4. A process as claimed in claim 1 comprising the further step of treating the separated mono-N-alkyl substituted piperazine with a salt of S-alkyl-iso thiourea.

5. A mineral acid salt of N-lauryl-N'-carbamidino piperazine having the formula

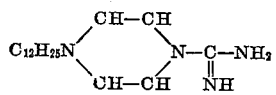

JOHANNES S. BUCK.
RICHARD BALTZLY.

REFERENCES CITED

The following references are of record in the file of this patent:

UNITED STATES PATENTS

| Number | Name | Date |
|---|---|---|
| 2,362,276 | Jayne | Nov. 7, 1944 |

FOREIGN PATENTS

| Number | Country | Date |
|---|---|---|
| 698,677 | French | Feb. 3, 1931 |

OTHER REFERENCES

Journal Chem. Soc. London, pages 39-49, 260-268, 1929.

Journal Chem. Soc. (Amer.), vol. 61, page 2704, 260-268.

Beilstein, vol. XXIII, Vierte Auflage., pages 5-9.

Journal Organic Chem., vol. 8, pages 338-340.

Berichte, vol. 66, pages 113-115.